US 6,573,969 B1

(12) United States Patent
Watanabe et al.

(10) Patent No.: US 6,573,969 B1
(45) Date of Patent: Jun. 3, 2003

(54) LIQUID CRYSTAL DISPLAY UNIT WITH CONDUCTIVE SPACERS BETWEEN TWO SUBSTRATE STRUCTURES FOR BIASING BACK CHANNELS OF THIN FILM TRANSISTORS

(75) Inventors: Makoto Watanabe, Tokyo (JP); Shoichi Kuroha, Tokyo (JP); Masanobu Hidehira, Tokyo (JP)

(73) Assignee: NEC Corporation (JP)

( * ) Notice: Subject to any disclaimer, the term of this patent is extended or adjusted under 35 U.S.C. 154(b) by 157 days.

(21) Appl. No.: 09/615,131

(22) Filed: Jul. 13, 2000

(30) Foreign Application Priority Data

Jul. 14, 1999 (JP) .......................................... 11-200153

(51) Int. Cl.⁷ ........................................... G02F 1/1339
(52) U.S. Cl. ...................... 349/155; 257/59; 257/347; 349/106; 349/110; 349/42
(58) Field of Search ............................... 349/155, 106, 349/110, 42; 257/59, 347

(56) References Cited

U.S. PATENT DOCUMENTS 5,748,266 A * 5/1998 Kodate ...................... 349/156
6,252,248 B1 * 6/2001 Sano et al. .................... 257/59

FOREIGN PATENT DOCUMENTS

| JP | 63-21907 | 5/1988 | ............. G09F/6/30 |
| JP | 04-194823 | 7/1992 | ............ G02F/1/136 |
| JP | 8-234212 | 9/1996 | ......... G02F/1/1339 |
| JP | 8-262484 | 10/1996 | ............ G02F/1/136 |
| JP | 08-278504 | 10/1996 | ......... G02F/1/1339 |
| JP | 9-120074 | 5/1997 | ......... G02F/1/1339 |
| JP | 9-325342 | 12/1997 | ......... G02F/1/1339 |
| JP | 10-48636 | 2/1998 | ......... G02F/1/1339 |
| JP | 11-2717 | 1/1999 | ............. G02B/5/20 |
| JP | 11-24082 | 1/1999 | ......... G02F/1/1339 |
| JP | 11-84394 | 3/1999 | ......... G02F/1/1339 |
| KR | 1996-0018694 | 6/1996 | ............ G02F/1/133 |

* cited by examiner

Primary Examiner—Robert H. Kim
Assistant Examiner—Thoi V Duong
(74) Attorney, Agent, or Firm—Hayes Soloway P.C.

(57) ABSTRACT

An active matrix type liquid crystal display includes an array of pixels each implemented by a combination of a thin film transistor, a pixel electrode connected through the thin film transistor to a signal line, a common electrode spaced from said pixel electrode and liquid crystal filling the gap between the pixel electrode and the common electrode, and spacers are inserted between a protective insulating layer over back channel regions of the thin film transistors and a planarization layer, wherein the spacers are conductive and fixed to a certain potential level in such a manner as to eliminate the conductivity from the back channel regions.

22 Claims, 13 Drawing Sheets

LIQUID CRYSTAL DISPLAY UNIT WITH CONDUCTIVE SPACERS BETWEEN TWO SUBSTRATE STRUCTURES FOR BIASING BACK CHANNELS OF THIN FILM TRANSISTORS

FIELD OF THE INVENTION

This invention relates to a liquid crystal display unit and, more particularly, to an active matrix liquid crystal display unit with spacers inserted between two substrate structures.

DESCRIPTION OF THE, RELATED ART

A typical example of the liquid crystal display is shown in FIG. 1. The prior art liquid crystal display unit is classified in an active matrix type with inverted stagger type thin film transistors. The prior art liquid crystal display comprises substrate structures, spacers 129 and liquid crystal 130. The spacers 129 are formed of transparent synthetic resin, and are like spherical beads. The spacers 129 are scattered over either substrate structure before the substrate structures are assembled. When the substrate structures are assembled, the spacers 129 create a gap between the two substrate structures, and the gap is filled with liquid crystal 130.

The lower substrate structure includes a glass substrate 101, scanning lines 102, thin film switching transistors 110, pixel electrodes 107 and an orientation layer 108. The thin film switching transistor 110 includes a part of the scanning line serving as a gate electrode, a gate insulating layer 103, a semi-conductor layer 104, a drain electrode 105 and a source electrode 106. The scanning lines 102 are patterned on the glass substrate 101, and are covered with the gate insulating layer. The semiconductor layers 104 are patterned on the gate insulating layer 104, and source/drain regions are formed in each of the semiconductor layers 104. The source region is spaced from the drain region, and the gate electrode or the part of the scanning line 102 is opposed to a back channel 111. The drain electrode 105 is held in contact with the drain region, and the source electrode 106 is held in contact with the source region. The pixel electrodes 107 are further patterned on the gate insulating layer 103, and are respectively associated with the thin film switching transistors 110. Each of the source electrodes 106 is connected to the associated pixel electrode 107. The thin film switching transistors 110 and the pixel electrodes 107 are covered with the orientation layer 108.

On the other hand, the upper substrate structure includes a glass substrate 121, a black matrix 122, a common electrode 123 and an orientation layer 128. The black matrix 122 is patterned on the glass substrate 121, and the common electrode 123 is patterned over the glass substrate 121 and the black matrix 122, and the black matrix is overlapped with a part of the common electrode 123. The common electrode 123 is covered with the orientation layer 128, and the orientation layer 128 is spaced from the orientation layer 108 by means of the spacers 129.

A problem is encountered in the prior art liquid crystal display unit in poor quality of images produced thereon. The poor quality images are due to the spacers 129 and obliquely incident light. In detail, the spacers 129 are scattered over one of the orientation layers 108/128 as described hereinbefore. It is unavoidable to position the spacers 129 over the pixel electrodes 107. The spacers over the pixel electrodes 107 vacate the liquid crystal 130, and permit the light to pass therethrough regardless of the orientation of liquid crystal molecules 130. Moreover, the spacers 129 vary the orientation of the liquid crystal molecules 130 therearound, and cause the amount of transmitted light and the tint to be uncontrollable. In case where the spacers 129 were not uniformly scattered, the amount of transmitted light is varied together with the dispersion of the density of the spacers 129. Thus, the spacers 129 are causative of the poor quality of images.

Although the black matrix 122 are formed on the glass substrate 121, the obliquely incident light reaches the back channel 111, and generates electron-hole pairs in the semiconductor layers 104. The electron-hole pairs vary the transistor characteristics of the thin film switching transistor 110, and potential difference is inappropriately applied between the associated pixel electrode 107 and the common electrode 123. This results in the poor quality of images.

A solution is disclosed in Japanese Patent Publication of Unexamined Application (laid-open) No. 8-234212. The prior art liquid crystal display is shown in FIG. 2. The prior art liquid crystal display also comprises substrate structures, spacers 169 and liquid crystal 170. A difference between the two prior art liquid crystal displays is the location of the spacers 169. The spacers 169 are not transparent. Although the spacers 129 are randomly scattered over the orientation layer 108/128, the spacers 169 are located over the back channel 151. When the substrate structures are assembled, the spacers 169 also create a gap between the two substrate structures, and the gap is filled with liquid crystal 170.

The lower substrate structure is similar to that shown in FIG. 1. Namely, the lower substrate structure includes a glass substrate 141, scanning lines 142, thin film switching transistors 150, pixel electrodes 147 and an orientation layer 148. The thin film switching transistor 150 includes a part of the scanning line serving as a gate electrode, a gate insulating layer 143, a semi-conductor layer 144, a drain electrode 145 and a source electrode 146. The scanning lines 142 are patterned on the glass substrate 141, and are covered with the gate insulating layer 143. The semiconductor layers 144 are patterned on the gate insulating layer 143, and source/drain regions are formed in each of the semiconductor layers 144. The source region is spaced from the drain region, and the gate electrode or the part of the scanning line 142 is opposed to the back channel 151. The drain electrode 145 is held in contact with the drain region, and the source electrode 146 is held in contact with the source region. The pixel electrodes 147 are further patterned on the gate insulating layer 143, and are respectively associated with the thin film switching transistors 150. Each of the source electrodes 146 is connected to the associated pixel electrode 147. The thin film switching transistors 150 and the pixel electrodes 147 are covered with the orientation layer 148.

The upper substrate structure includes a glass substrate 161, a common electrode 163 and an orientation layer 168. The common electrode 163 is patterned on the glass substrate 161, and is covered with the orientation layer 168. The spacers 169 are inverted between the orientation layers 148 and 168, and the gap is filled with the liquid crystal 170.

The spacers 129 are replaced with the spacers 169, and are non-transparent. Even if light is obliquely incident on the prior art liquid crystal display, the non-transparent spacers 169 prevent the back channels 151 from the incident light, and keeps the transistor characteristics constant. Moreover, there is not any spacer over the pixel electrodes 147, and the liquid crystal occupies the gap between the pixel electrodes 147 and the common electrode 163. This results in that the turbulence is negligible in the orientation of the liquid crystal molecules. The spacers 169 are less influential on the liquid crystal molecules between the pixel electrodes 147 and the common electrode 163. The orientation of liquid crystal molecules is simply dependent on the potential difference between the pixel electrodes 147 and the common electrode 163, and the transmittance of the liquid crystal 170 is constant in the liquid crystal 170 under a standard bias condition. Thus, the location of the spacers 169 is effective against the poor quality of images. However, a problem is encountered in the prior art liquid crystal display unit disclosed in the Japanese Patent Publication of Unexamined Application in that malfunction takes place in the thin film switching transistors 150.

In detail, although the spacer 169 is not connected to any source of voltage, the spacer 169 is charged and varied due to the electric field thereabround. The protective insulating layer 148 is inserted between the spacer 169 and the semiconductor layer 144, and forms a capacitor together with the spacer 169 and the semiconductor layer 144. In other words, the spacer 169 serves as a back gate of a field effect transistor, and the potential level on the spacer 169 has an influence on the conductance of the back channel 151. The thin film switching transistor 150 is equivalent to the parallel combination of two field effect transistors as shown in FIG. 3. In FIG. 3, "$V_{SP}$", "$V_G$", "$V_D$", "$V_{COM}$" and "CLS" stand for the potential level on the spacer 169, the potential level on the scanning line 142, the potential level on the drain electrode 145, the potential level on the common electrode 163 and the capacitance of the liquid crystal 170, respectively. Even though the front channel 152 is controlled with the potential level $V_G$, the potential level $V_{SP}$ on the spacer 169 is influential on the back gate 151 more than the potential level $V_G$ on the scanning line 142, and the spacer 169 gives the conductance to the back channel 151 depending upon the potential level $V_{SP}$.

When the spacer 169 is charged, the electric charge changes the potential level on the spacer 169. Even if the spacer 169 is not charged, the spacer 169 is under the influence of the potential level on the common electrode 163, and the induced charge changes the potential level on the spacer 169.

FIG. 4 illustrates the voltage-to-current characteristics of a standard thin film transistor of amorphous silicon. If the spacer 169 does not have a sufficiently low potential level, current $I_{DS}$ flows through the back channel 151 in spite of the low potential level $V_{GOFF}$, and undesirably changes the potential level on the pixel electrode 147. This results in that the liquid crystal molecules 170 change the orientation from the designed angle. When the orientation is changed, the piece of liquid crystal over the pixel electrode 147 changes the transmittance. If the potential level on the spacers 169 is dispersed, the lightness is undesirably varied over the images. This results in poor quality of images produced on the prior art liquid crystal display unit.

SUMMARY OF THE INVENTION

It is therefore an important object of the present invention to provide a liquid crystal display unit, which produces high quality images.

To accomplish the object, the present invention proposes to bias a spacer to a certain voltage level so as to decrease a conductance of a back channel.

In accordance with one aspect of the present invention, there is provided a liquid crystal display unit comprising a first substrate structure including a first transparent substrate, at least one thin film transistor fabricated on the first transparent substrate and having a first channel region and a second channel region closer to the first transparent substrate than the first channel region, at least one pixel electrode formed over the first transparent substrate and connected through the at least one thin film transistor to a source of signal for creating an electric field and a protective insulating layer covering the at least one thin film transistor, a second substrate structure spaced from the first substrate structure so as to form a gap, at least one conductive spacer inserted between the protective insulating layer and the second substrate structure and connected to a source of potential level so that the first channel region is biased with a certain potential level for decreasing a conductance of the first channel region, and liquid crystal filling the gap between the protective insulating layer and the second substrate structure and changing an orientation depending upon the strength of the electric field.

BRIEF DESCRIPTION OF THE DRAWINGS

The features and advantages of the liquid crystal display unit will be more clearly understood from the following description taken in conjunction with the accompanying drawings in which.

DESCRIPTION OF THE PREFERRED EMBODIMENTS

First Embodiment

Figure 1:
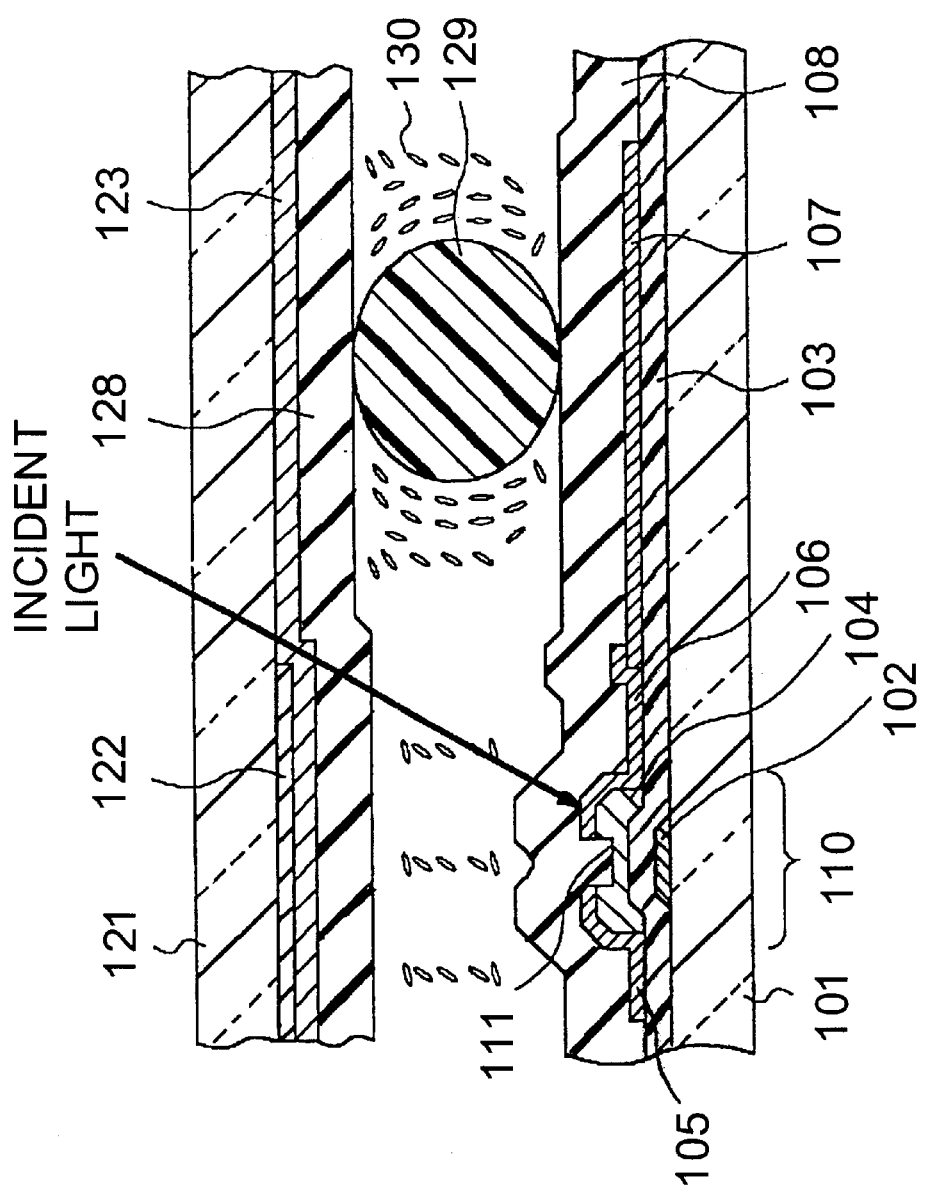
FIG. 1 is a cross sectional view showing the structure of the prior art liquid crystal display unit.
Figure 2:
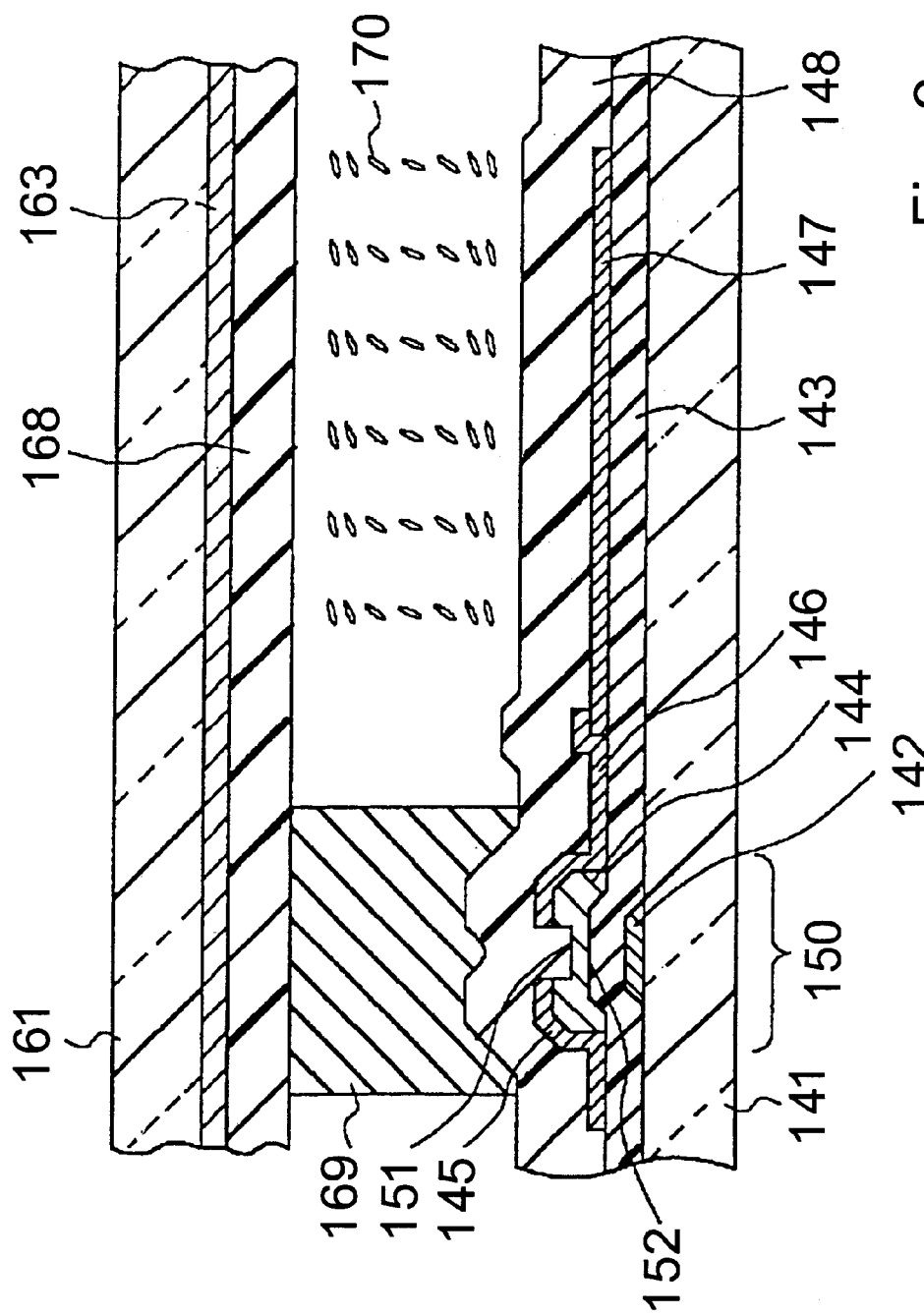
FIG. 2 is a cross sectional view showing the structure of the prior art liquid crystal display unit disclosed in Japanese Patent Publication of Unexamined Application No. 8-234212.
Figure 3:
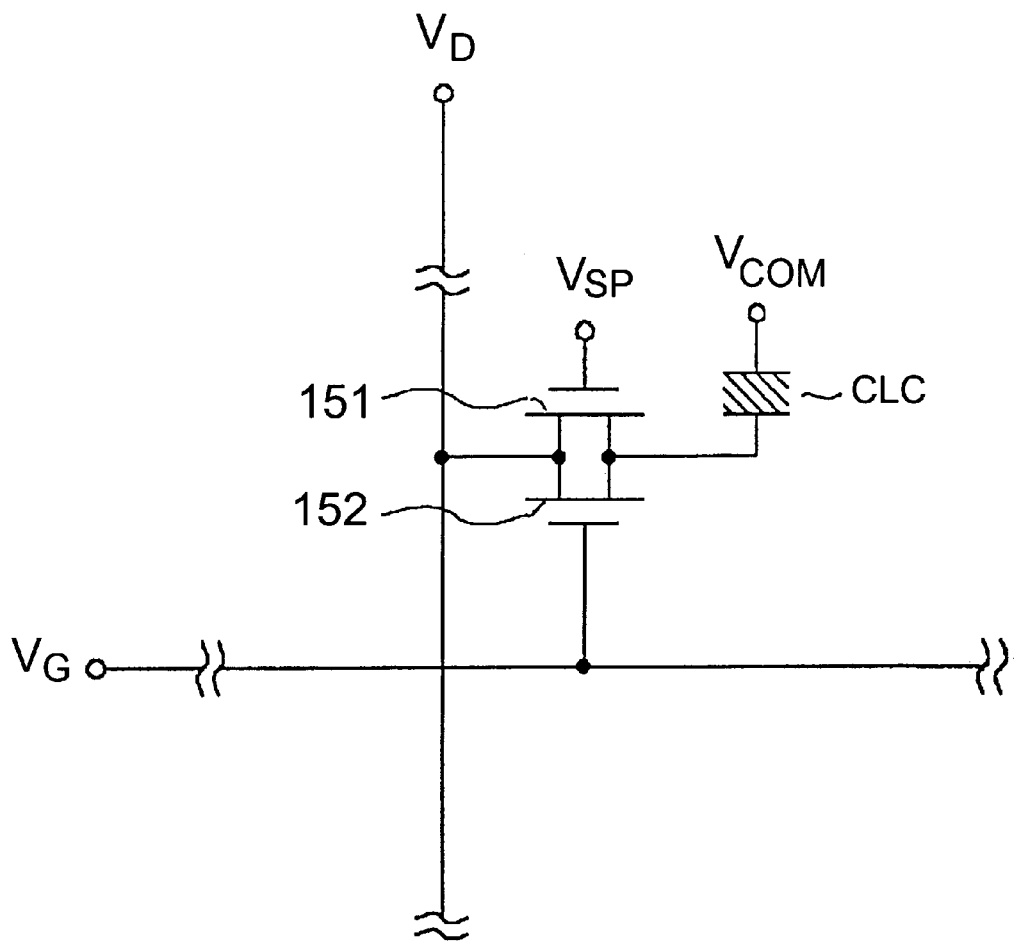
FIG. 3 is a circuit diagram showing the equivalent circuit of the thin film switching transistor incorporated in the prior art liquid crystal display unit.
Figure 4:
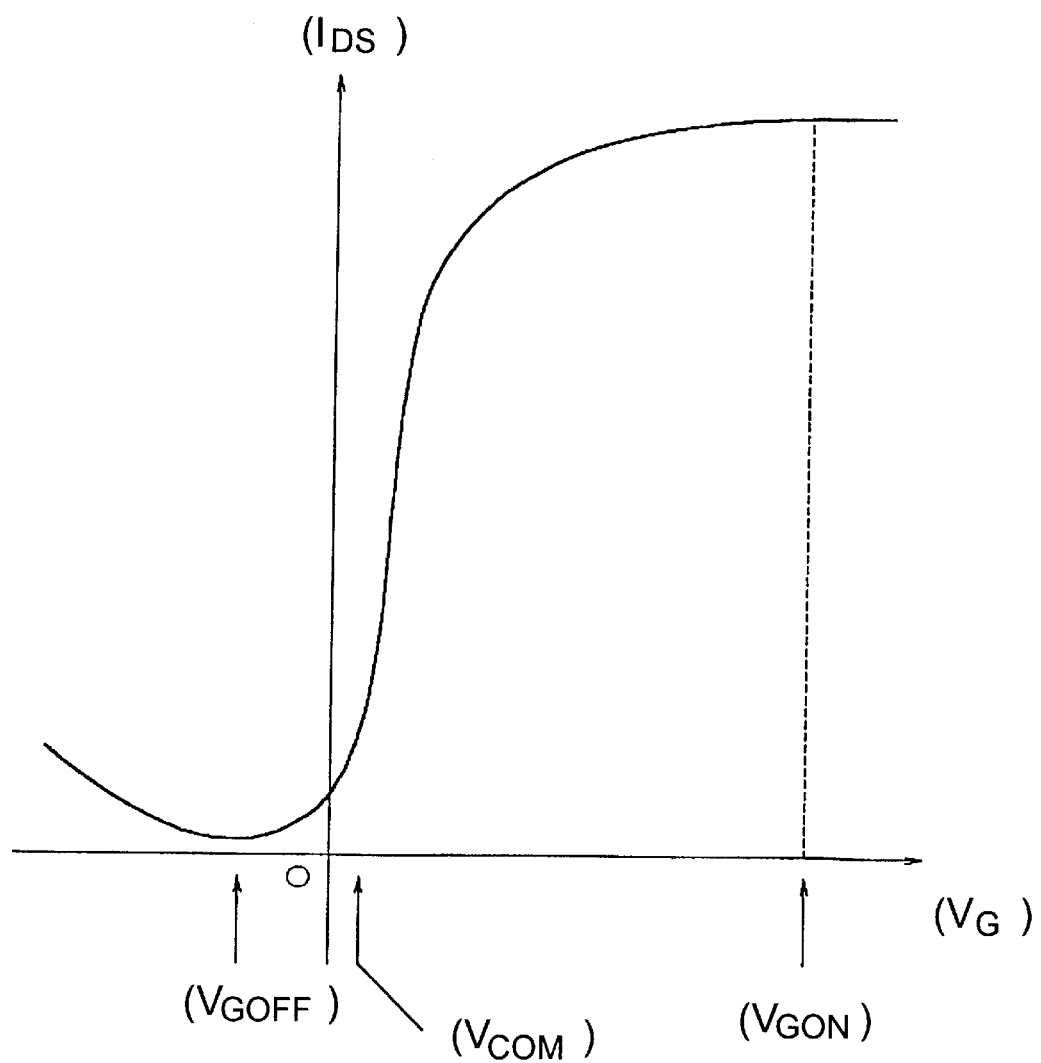
FIG. 4 is a graph showing the gate voltage-to-drain current characteristics of the standard thin film amorphous silicon transistor.
Figure 5:
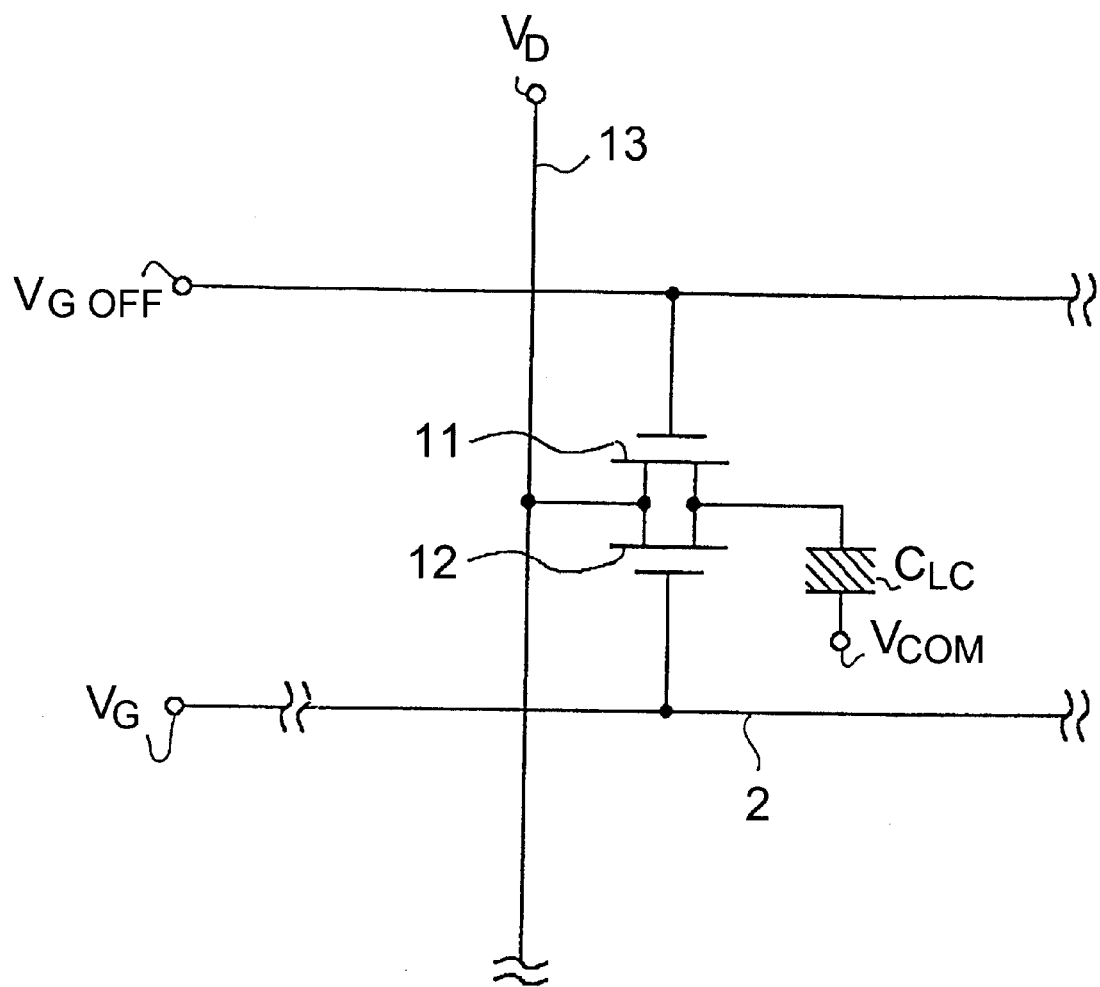
FIG. 5 is a circuit diagram showing an equivalent circuit of a pixel incorporated in a liquid crystal display unit according to the present invention.

As described in conjunction with the prior art liquid crystal display unit shown in FIG. 2, the spacer 169 is located over the back channel 151 of the inverted stagger type thin film transistor 150, and serves as a back gate electrode electrically isolated from other conductive layers. On the other hand, a liquid crystal display unit embodying the present invention also includes spacers between two substrate structures, and the spacers are biased with a certain potential for keeping back channels of thin film switching transistors in off-state. The certain potential is labeled with "$V_{OFF}$" in FIG. 4. This results in that the thin film switching transistor is equivalent to the circuit shown in FIG. 5 where a back channel 11 is turned off at all times. The certain potential $V_{GOFF}$ is hereinbelow referred to as "gate-off potential".

Figure 6:
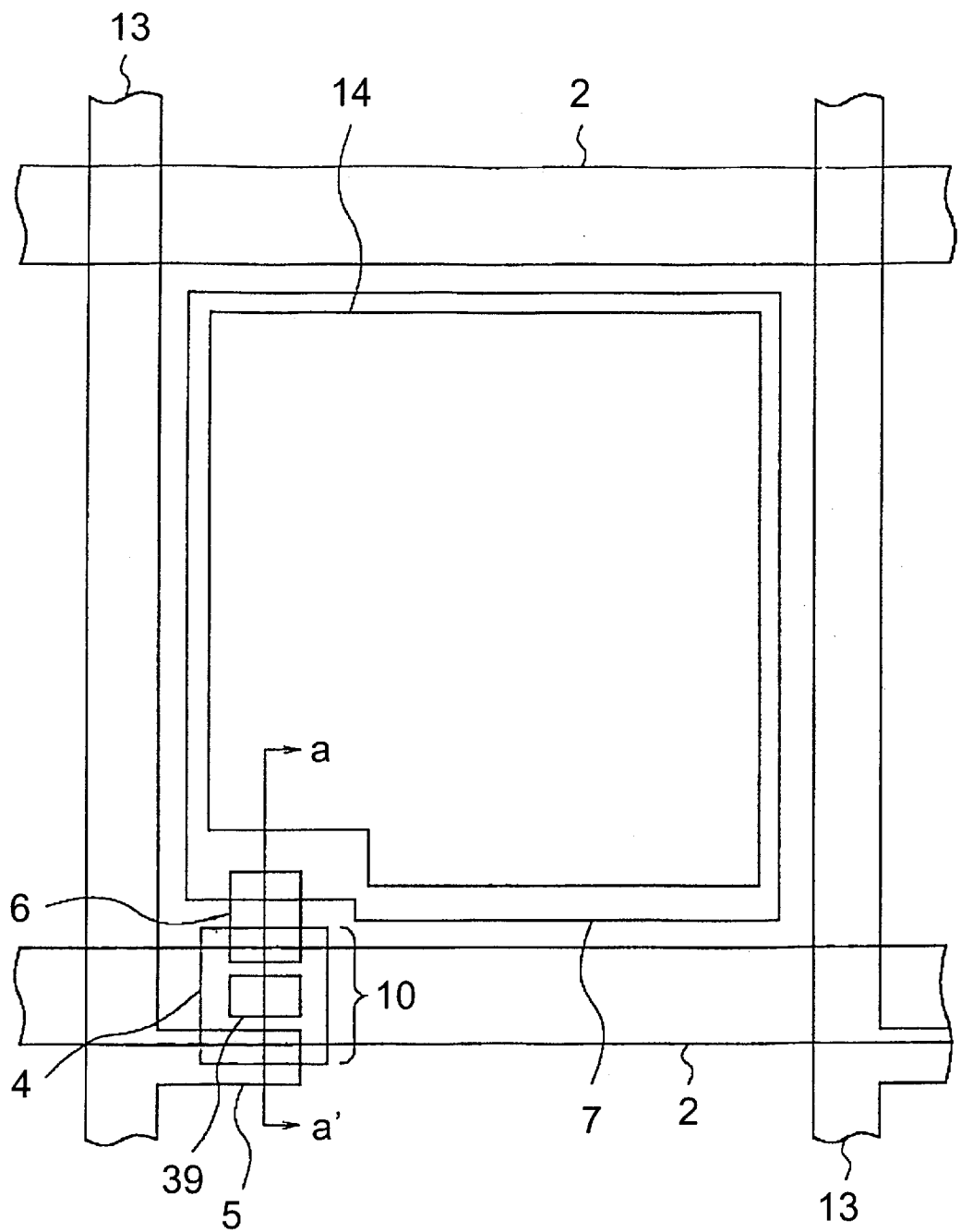
FIG. 6 is a view showing the layout of the pixel incorporated in the liquid crystal display unit.
Figure 7:
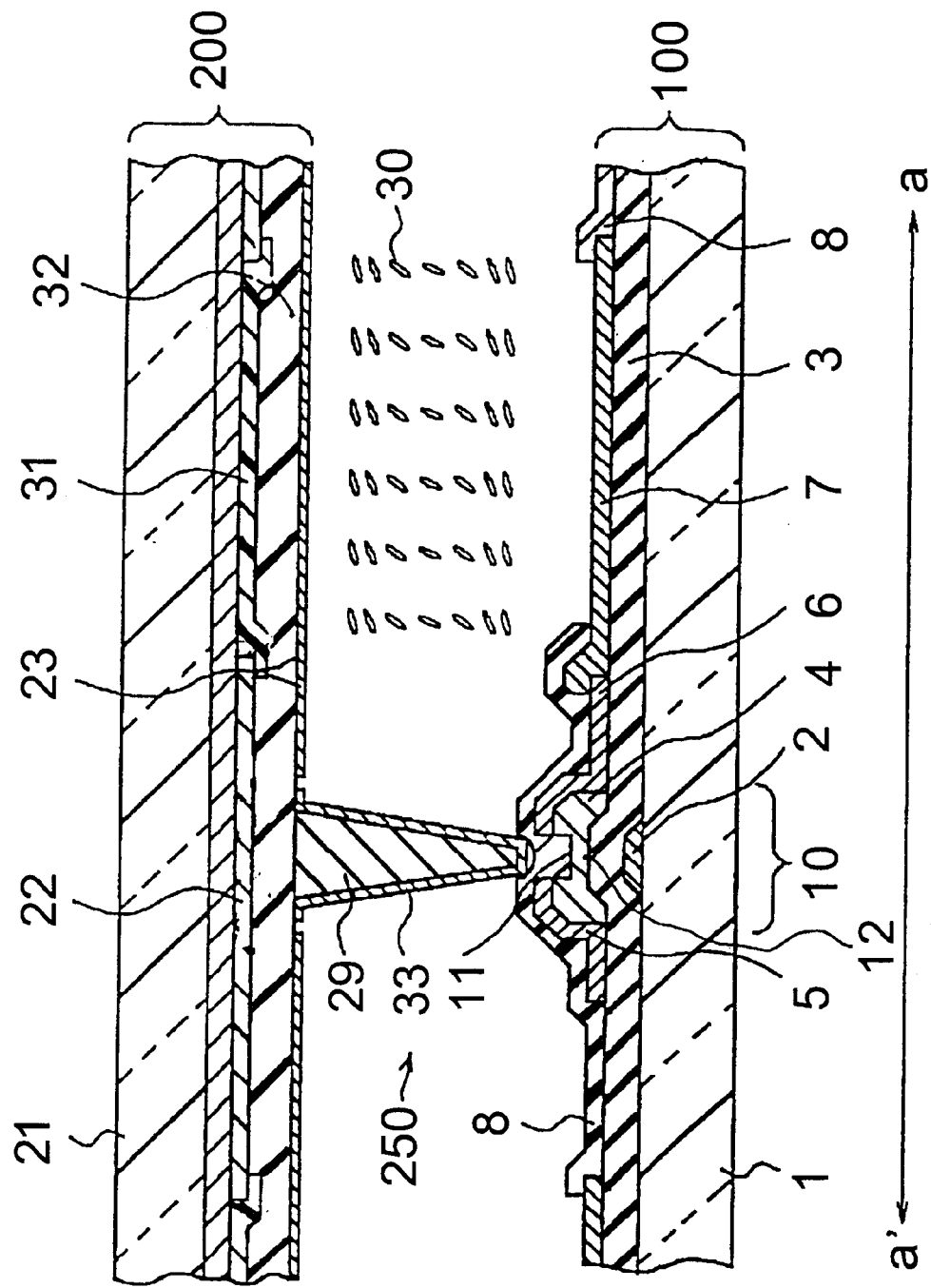
FIG. 7 is a cross sectional view taken along line a–a' of FIG. 6 and showing the structure of the pixel.
Figure 8:
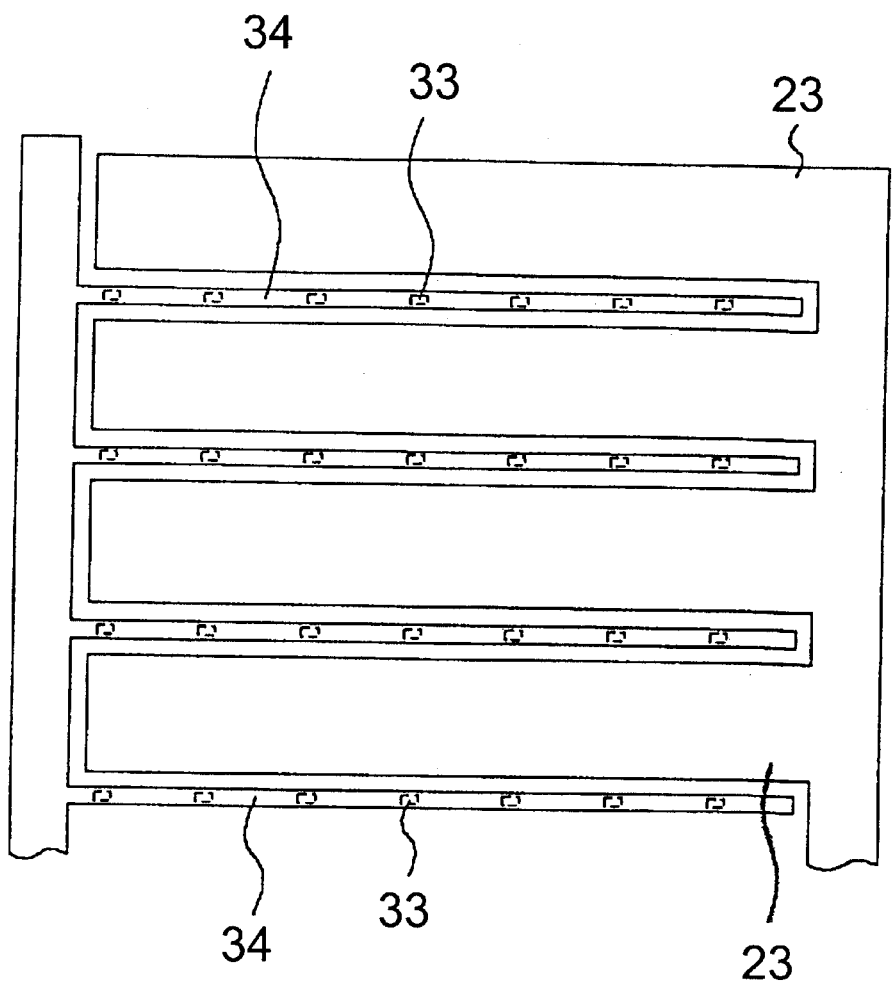
FIG. 8 is a bottom view showing the layout of conductive pattern on the inner surface of a second substrate structure.

Turning to FIGS. 6, 7 and 8, the liquid crystal display unit embodying the present invention largely comprises a first substrate structure 100, a second substrate structure 200, spacers 250 inserted between the first substrate structure 100 and the second substrate structure 200 and liquid crystal 30 filling the gap between the first substrate structure 100 and the second substrate structure 200. These components 100, 200, 250 and 30 form plural pixels arranged in matrix, and each of the pixels includes a thin film switching transistor 10, a pixel electrode 7, a common electrode 23 and part of liquid crystal layer 30 between the pixel electrode 7 and part of the common electrode 23 opposite to the pixel electrode 7. The common electrode 23 is transparent, and is shared between the pixels. Thus, the liquid crystal display unit embodying the present invention is of the type called as "active matrix", and the thin film switching transistor 10 is classified in the inverted stagger type thin film transistor. Although the first and second substrate structures 100/200 further have polarization layers for polarizing the light and orientation layers for orientating the liquid crystal molecules, these layers are deleted from the figures for the sake of simplicity.

The matrix of pixels is associated with scanning lines 2 and signal lines 13. The scanning lines 2 and the signal lines 13 perpendicularly extend over a glass substrate 1 of the first substrate structure 100. However, the scanning lines 2 are electrically isolated from the signal lines 13. Each of the scanning lines 2 offers gate electrodes to the thin film switching transistors 10 in the associated row of pixels, and the thin film switching transistors 10 are connected between the associated signal lines 13 and the associated pixel electrodes 7. Although the scanning lines 2 and the signal lines 13 are connected to an external signal source, the external signal source is not shown in the drawings.

The scanning lines 2 are sequentially changed to an active level, and the signal lines 13 are electrically connected to the pixel electrodes 14 in the associated row. While the scanning lines 2 are being sequentially changed to the active level, video signals representative of a picture are selectively supplied to the pixel electrodes 7, and the picture is produced on the matrix of the pixels. A black matrix 22 defines openings 14 (see FIG. 6), and each of the openings 14 is nested in associated one of the pixel electrodes 7.

The first substrate structure 100 includes the glass substrate 1, the scanning lines 2, the thin film switching transistors 10, the signal lines 13, the pixel electrodes 7 and a protective insulating layer 8. The glass substrate 1 is transparent. The scanning lines 2 are formed in parallel on a major surface of the glass substrate 1, and the signal lines 2 and the remaining surface of the glass substrate 1 are covered with a gate insulating layer 3. The gate insulating layer 3 is shared between the thin film switching transistors 10. The thin film switching transistors 10 are similar in structure to one another, and description is made on one of the thin film switching transistors 10.

A semiconductor layer 4 is formed on the gate insulating layer 3, and is located over the associated scanning line 2. The semiconductor layer 4 may be amorphous silicon. The signal lines 13 are patterned on the gate insulating layer 3. A drain region and a source region are formed in the semiconductor layer 4, and are spaced from each other. The semiconductor layer 4 is partially depressed between the source region and the drain region. A back channel 11 and a front channel 12 are formed in the semiconductor layer 4 between the drain region and the source region. A drain electrode 5 projects from the associated signal line 13, and is held in contact with the drain region. A source electrode 6 is further formed on the gate insulating layer 3, and is held at one end portion thereof with the source region and at the other end portion thereof to the pixel electrode 7. The gate insulating layer 3, the semiconductor layer 4, the drain electrode 5, the source electrode 6 form in combination the thin film switching transistor 10 together with the part of the scanning line 2 serving as the gate electrode. The thin film switching transistors 10 and the signal lines 13 are covered with the protective insulating layer 8. However, the pixel electrodes 7 are exposed to openings formed in the protective insulating layer 8. The thin film switching transistor 10 is conformably covered with the protective insulating layer 8, and a recess is formed in the protective insulating layer 8. The recess is located over the back channel 11.

The second substrate structure 200 includes a glass substrate 21, the black matrix 22, color filters 31, a planarization layer 32, spacer bodies 29, spacer electrodes 33 and a common electrode 23. The glass substrate 21 is transparent. The black matrix 22 is like a lattice, and the inner edges of the black matrix 22 respectively define the openings 14 as described hereinbefore. The openings 14 are respectively nested in the pixel electrodes 7, and, accordingly, the pixel electrodes 7 are exposed to the openings 14 except the peripheral areas thereof. The openings 14 are covered with the color filters 31, which are selectively colored red, green and blue.

On the other hand, the thin film switching transistors 10, the scanning lines 2 and the signal lines 13 are under the black matrix 22, and the pixel electrodes 31 are opposed to the color filters 31, respectively. When light passes through the pieces of liquid crystal 30 over the pixel electrodes 7, the light is colored by the color filters 31, and color images are produced over the matrix of the pixels.

The black matrix 22 and the color filters 31 are covered with the planarization layer 32 so as to create a smooth surface. The spacer bodies 29 project from the smooth surface, and are formed of synthetic resin. The synthetic resin has photo-shielding property. In the fabrication process, the synthetic resin is spread, and the synthetic resin layer is patterned to the spacer bodies 29.

Conductive material was deposited over the smooth surface and spacer bodies 29, and the conductive material layer was patterned into the common electrode 23 and the spacer electrodes 33. The common electrode 23 has a comb-like shape (see FIG. 8), and the spacer electrodes 33 are electrically connected to a conductive pattern 34. The conductive pattern 34 is also shaped into a comb-like configuration, and is interdigitated with the common electrode 23. However, the conductive pattern 34 is spaced from the common electrode 23. Thus, the spacer electrodes 33 are electrically isolated from the common electrode 23. The spacer bodies 29 and the spacer electrodes 33 form in combination the spacers 250. The leading ends of the spacers 250 are respectively received in the recesses formed in the protective insulating layer 8, and are held in contact with the protective insulating layer 8 over the associated back channels 11. Thus, the spacer electrodes 33 are opposed to the back channels of the thin film switching transistors 10.

The gate-off potential $V_{GOFF}$ is supplied through the conductive pattern 34 to the spacer electrodes 33. The common electrode 23 and the conductive pattern 34 reach a peripheral area around the displaying area, and are connected from the peripheral area to the first substrate structure 100 by using silver paste or conductive sealing layers.

Turning back to FIG. 7, the common electrode 23 is opposed to the pixel electrodes 7, and a potential level $V_{COM}$ is applied to the common electrode 23. Thus, potential differences are selectively applied between the pixel electrodes 7 and the common electrode 23.

The second substrate structure 200 is assembled with the first substrate structure 100, and the gap therebetween is filled with the liquid crystal 30.

The liquid crystal display unit described hereinbefore is effective against the poor quality of images produced on the matrix of pixels. While the liquid crystal display unit is producing images on the matrix of pixels, the gate-off potential is continuously applied through the conductive pattern 34 to the spacer electrodes 33. The spacer electrodes 34 are opposed to the back channels 11 through the protective insulating layer 8, and induce the carrier opposite in conductivity type to the dopant impurity introduced into the conductive layer 4. The induced carrier removes the conductivity from the back channels 11 at all times, and only the front channels 12 can propagate the video signals from the signal lines 13 to the pixel electrodes 7. In other words, when a scanning line 2 is changed to the active level, the associated thin film transistors 10 turn on, and the video signals are propagated only through the front channels 12 to the pixel electrodes 7. However, when the scanning line 2 is recovered to the inactive level, all the conductive channels are removed from the associated thin film switching transistors 10, and the pixel electrodes 7 are electrically isolated from the signal lines 13. This means that the potential level of the pixel electrodes 7 is hardly decayed. The potential differences between the pixel electrodes 7 and the common electrode 23 keep the liquid crystal molecules 30 in the given orientation, and images are stably produced on the matrix of pixels.

Moreover, the spacer electrodes 33 are fixed to the gate-off potential level $V_{GOFF}$. This means that all the thin film switching transistors 10 stably exhibit the transistor characteristics without any exception. The lightness of the pixels is strictly dependent on the video signals, and does not fluctuate. This results in improvement of the contrast of the images.

Although liquid crystal in the cyano system is relatively low in electric resistivity, the liquid crystal in the cyano system is available for the liquid crystal display unit according to the present invention, because the spacers 250 make the potential level on the back channels 11 stable. The manufacturer can select the most appropriate liquid crystal from various candidates.

Finally, the spacers 250 enhance the production yield of the liquid crystal display unit, because the offset between the first substrate structure and the second substrate structure 100 is decreased. In detail, the recesses are formed in the protective insulating layer 8 due to the back channels 11 depressed from the drain/source electrodes 5/6, and the recesses receive the leading ends of the associated spacers 250 in the assembling work. The spacers 250 are respectively aligned with the back channels 11 of the associated thin film switching transistors 10, and, accordingly, the first substrate structure 100 is exactly assembled with the second substrate structure 100.

Second Embodiment

Figure 9:
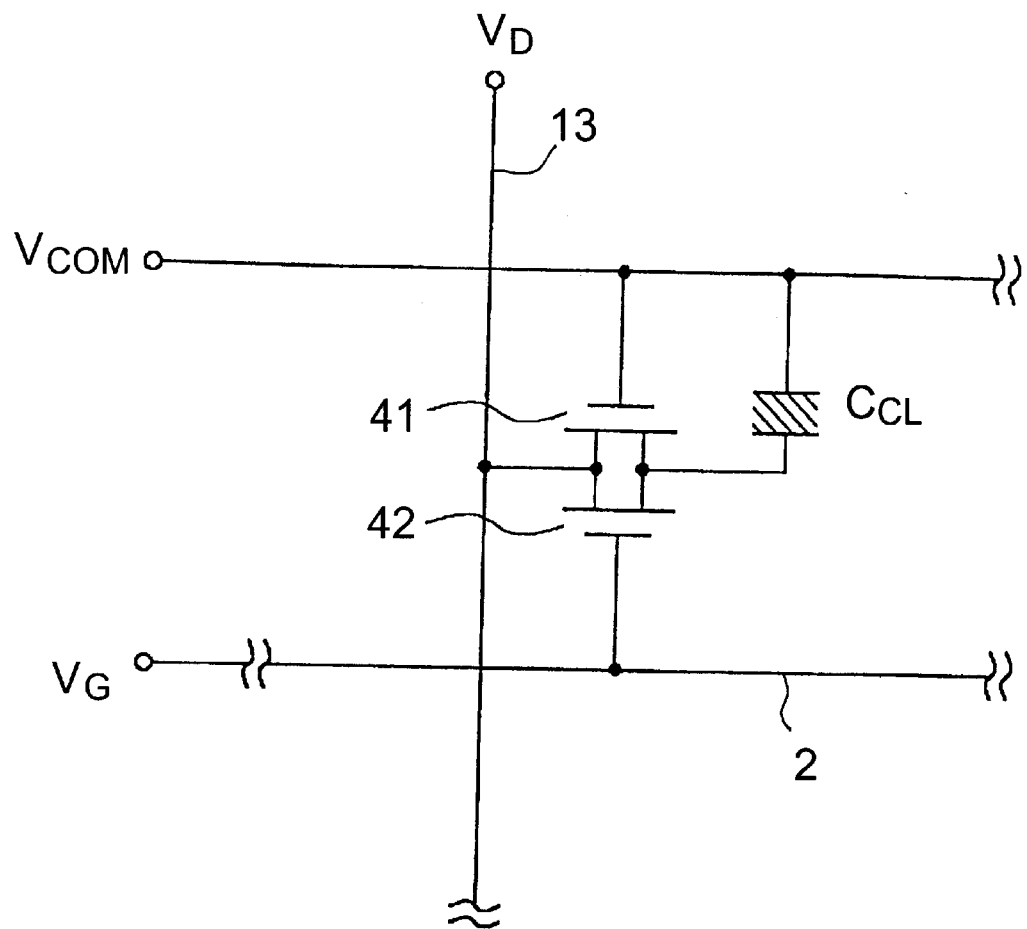
FIG. 9 is a circuit diagram showing an equivalent circuit of a pixel incorporated in another liquid crystal display unit according to the present invention.
Figure 10:
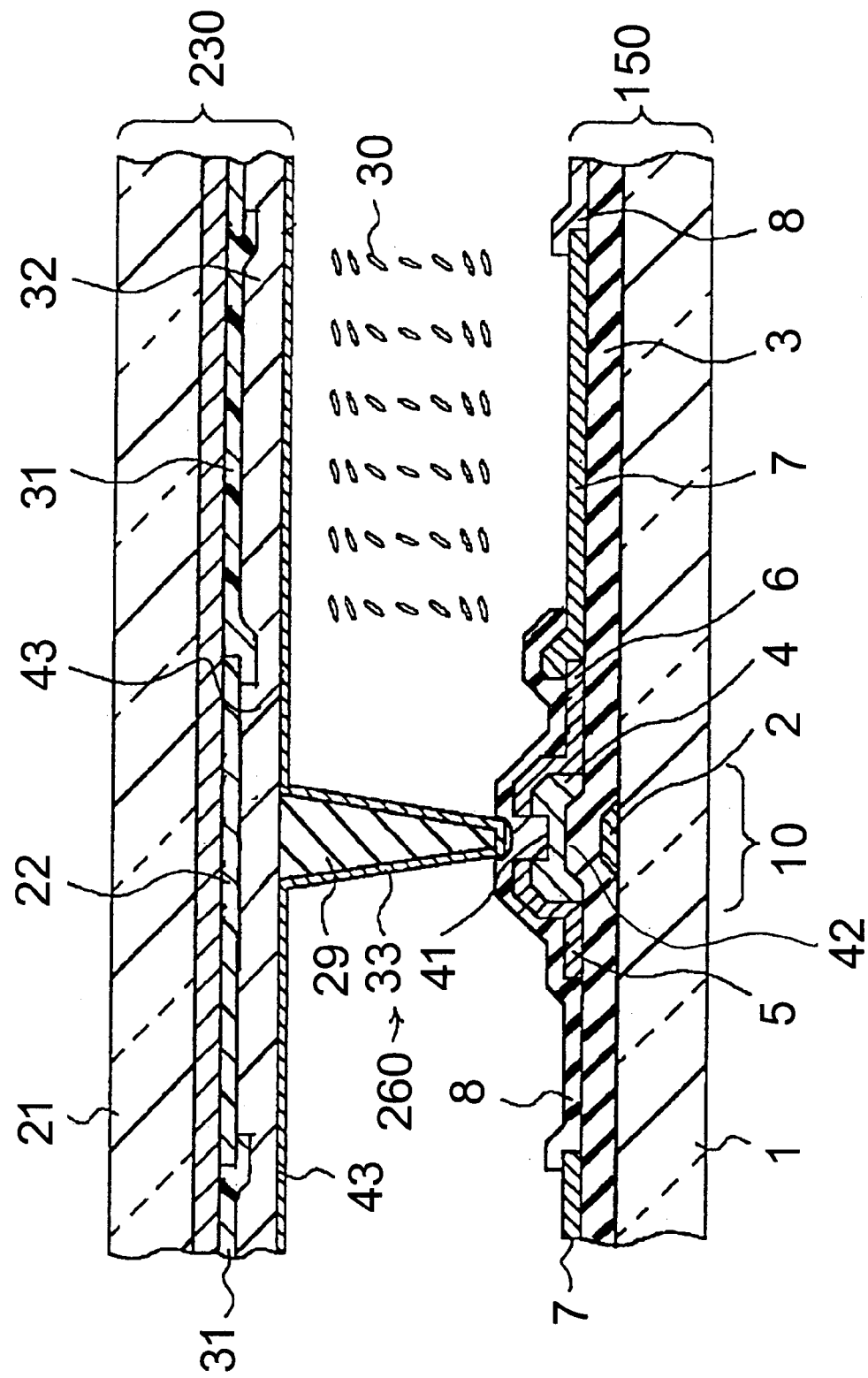
FIG. 10 is a cross sectional view showing the structure of the pixel.
Figure 11:
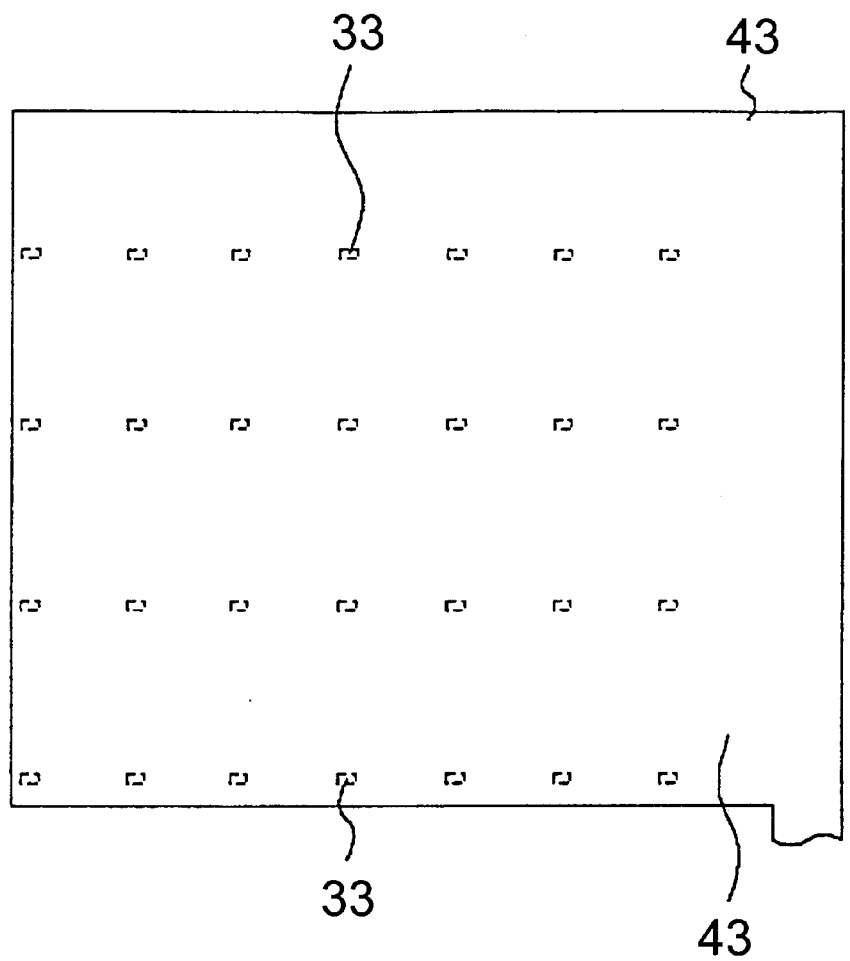
FIG. 11 is a bottom view showing the layout of conductive pattern on the inner surface of a second substrate structure incorporated in the liquid crystal display unit.

Turning to FIGS. 9, 10 and 11, another liquid crystal display unit embodying the present invention largely comprises a first substrate structure 150, a second substrate 230, liquid crystal 30 and spacers 260. The spacers 260 project from the second substrate structure 230, and space the first substrate structure 150 from the second substrate structure 230. The gap between the first substrate structure 150 and the second substrate structure 230 is filled with the liquid crystal. The spacers 260 are conductive, and are biased to a certain potential level equal to the bias voltage $V_{COM}$ on a common electrode 43 forming a part of the second substrate structure 230.

The first substrate structure 150 is similar in structure to the first substrate structure 100, and layers and electrodes of the first substrate structure 150 are labeled with the references same as those designating corresponding layers and electrodes of the first substrate structure 100. The thin film switching transistor 10 has a back channel region 41 and a front channel region 42. The spacer 260 is held on contact with the protective insulating layer 8 over the back channel region 41, and, accordingly, is opposed to the back channel 41. Since the bias voltage $V_{COM}$ is applied to the spacers 260, the pixel is equivalent to a circuit shown in FIG. 9.

The protective insulating layer 8 is conformably formed over the thin film switching transistors 10, and is depressed at the area over the back channel regions 41. The spacers 260 are inserted into the recesses in the protective insulating layer 8, and are embedded at the leading end portion in the protective insulating layer 8. The spacers 260 and the recesses in the protective insulating layer 8 prevent the liquid crystal display unit from offset between the first substrate structure 150 and the second substrate structure 230. Thus, the spacers 260 and the recesses are effective against the offset in the assembling stage.

The second substrate structure 230 is different from the second substrate structure 200 in a conductive pattern on the inner surface thereof. However, other layers are similar to those of the second substrate structure 200, and are also labeled with the references same as those designating corresponding layers of the second substrate structure 200.

In order to apply the bias voltage $V_{COM}$ to the spacers 260 over the thin film switching transistors 10, the spacer bodies 29 are respectively covered with the electrodes 33, and the spacer electrodes 33 are integral with the common electrode 43 as shown in FIG. 11. The common electrode 43 is connected to a source of bias voltage $V_{COM}$. Thus, the bias voltage $V_{COM}$ is supplied through the common electrode 43 to the spacer electrodes 33, and the spacer electrodes 33 are equal in potential level to the common electrode 43.

The conductive spacers 260 eliminate conductive back channels form the back channel regions 41, and make the thin film switching transistors 10 uniform in transistor characteristics. This results in the advantages same as those of the liquid crystal display unit implementing the first embodiment. Although the bias voltage $V_{COM}$ is closer to the gate-off $V_{GOFF}$ potential than the gate-on potential $V_{GON}$ (see FIG. 4), the bias voltage $V_{COM}$ allows a low-conductive back channel to take place in each of the back channel regions 41, and leakage current flows between the pixel electrodes 7 and the signal lines 13. However, the amount of leakage current is not serious. For this reason, the pixels keep the liquid crystal molecules 30 appropriately oriented, and the picture is improved in contrast. The liquid crystal 30 is selectable from various kinds of liquid crystal.

The common electrode 43 is advantageous over the common electrode 23 in the fabrication process. The common electrode 23 is separated from the spacer electrodes 33, and a patterning step is required for the separation. On the other hand, the common electrode 43 extends over the entire inner surface of the first substrate structure 230, and any patterning step is not required for the common electrode 43. Thus, the common electrode 43 makes the fabrication process simple.

Although Japanese Patent Publication of Unexamined Application No. 8-262484 teaches how the bias voltage $V_{COM}$ is applied to the spacers 260, the spacers disclosed in the Japanese Patent Publication of Unexamined Application are placed on storage capacitor lines, and are different from the spacers 260. However, the biasing system in the Japanese Patent Publication of Unexamined Application is modifiable for the liquid crystal display unit according to the present invention.

Third Embodiment

Figure 12:
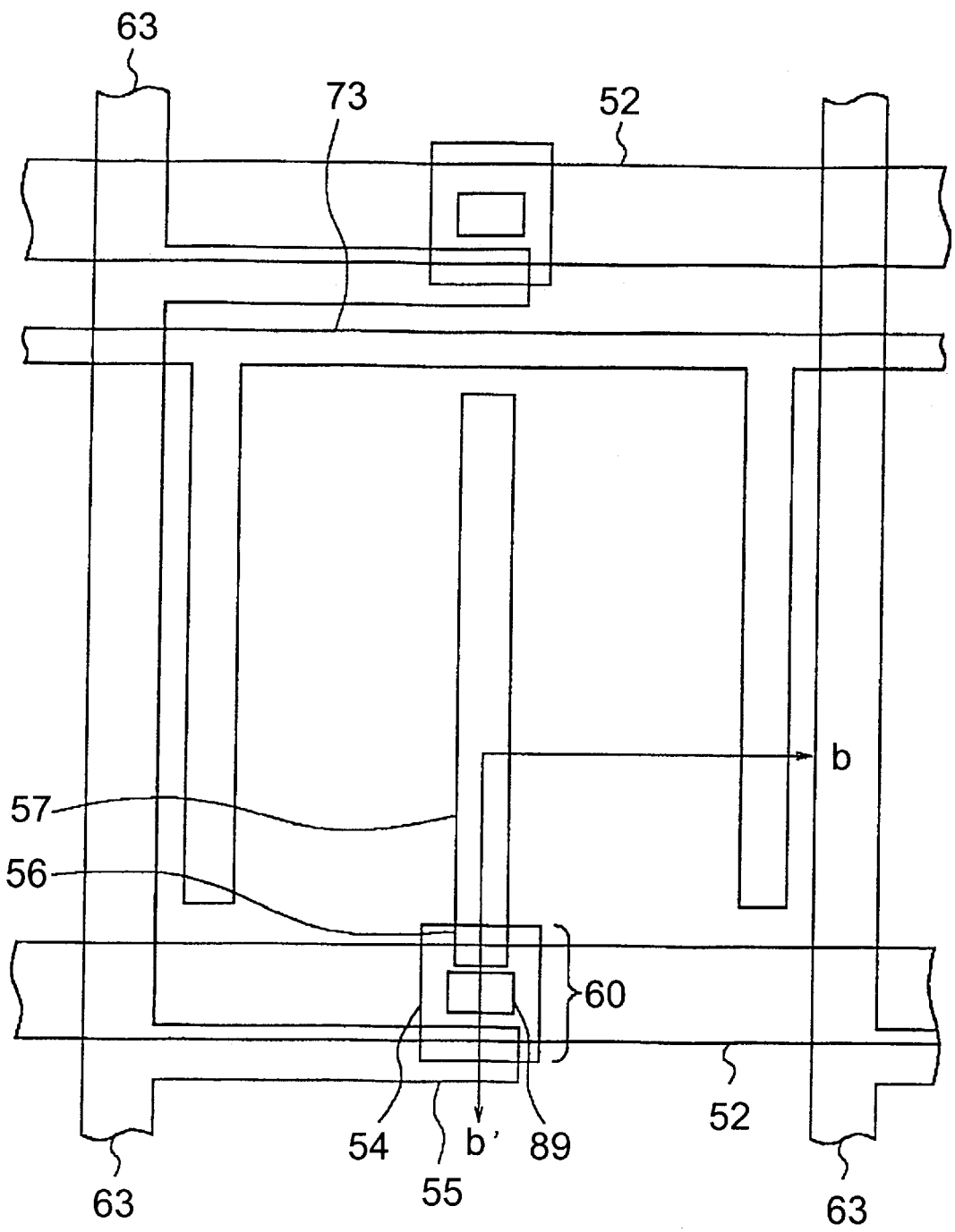
FIG. 12 is a plane view showing the layout of a pixel incorporated in yet another liquid crystal display unit according to the present invention.
Figure 13:
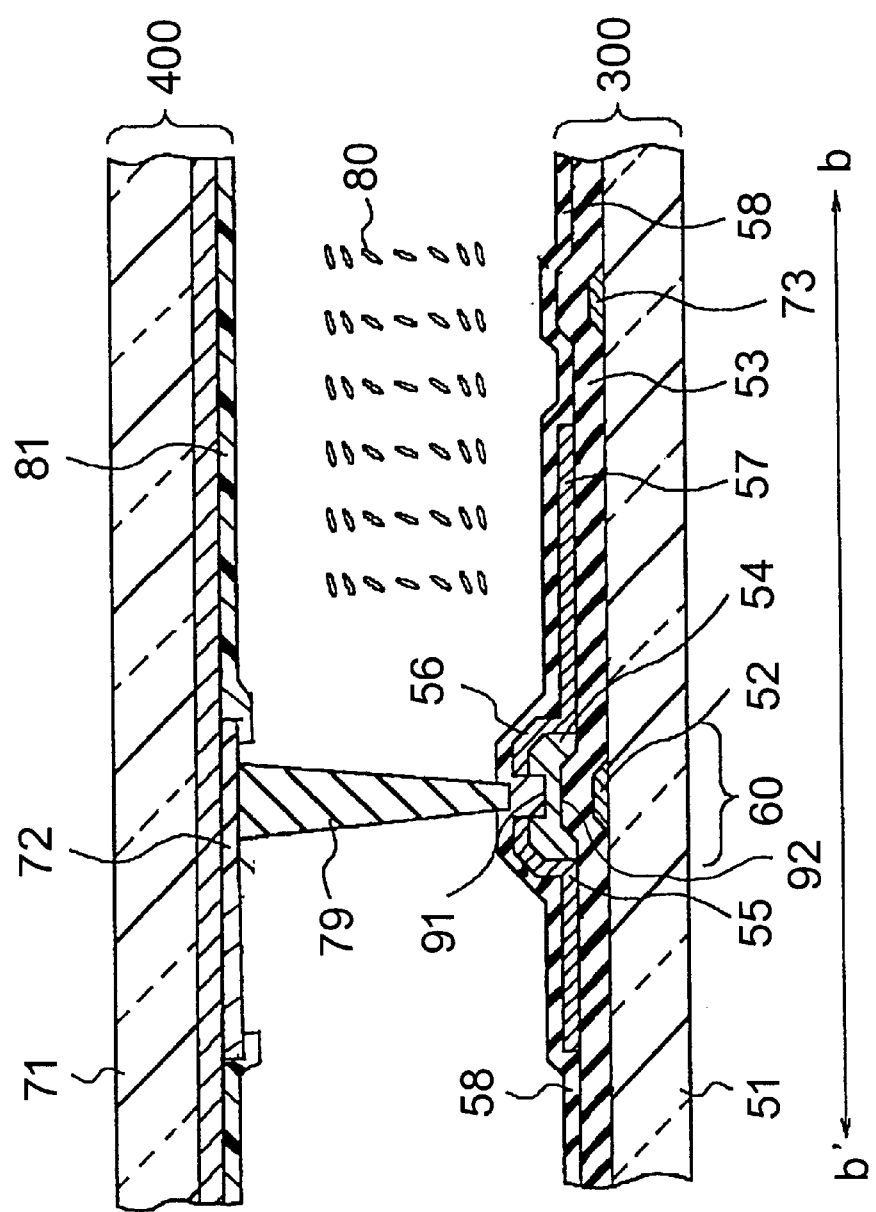
FIG. 13 is a cross sectional view taken along line b–b' of FIG. 12 and showing the structure of the pixel.

Turning to FIGS. 12 and 13 of the drawings, yet another liquid crystal display unit embodying the present invention largely comprises a first substrate structure 300, a second substrate structure 400, spacers 79 and liquid crystal 80. The first substrate structure 300 is opposed to the second substrate structure 400, and is spaced from the second substrate structure 400 by means of the spacers 79. A gap takes place between the first substrate structure 300 and the second substrate structure 400, and is filled with liquid crystal 80.

The liquid crystal display unit implementing the third embodiment is categorized in a lateral electric field driving type. A typical example of the lateral electric field driving type liquid crystal display unit is disclosed in Japanese Patent Publication of Examined Application No. 63-21907. The typical example of the lateral electric field driving type liquid crystal display unit does not have any common electrode on the second substrate structure, and the electric field is created in parallel to the first substrate structure.

The first substrate structure 300 includes a glass substrate 51, scanning lines 52, common electrodes 73, thin film switching transistors 60, pixel electrodes 57, signal lines 63 and a protective insulating layer 58. The scanning lines 52 are connected to an external signal source, and are selectively changed to an active level. On the other hand, video signals are supplied to the signal lines 63, and cause the matrix of pixels to produce a picture. The scanning lines 52 are formed on the glass substrate 51 at intervals, and the common electrodes 73 are altered with the scanning lines 52. The common electrodes 73 are shaped into a comb-like configuration as shown in FIG. 12.

The thin film transistors 60 are formed over the scanning lines 52. Each of the thin film transistors 60 has a gate insulating layer 53, a semiconductor layer 54, a drain electrode 55, a source electrode 56. The gate insulating layer 53 is shared between the thin film transistors 60, and the scanning lines 52 and the common electrodes 73 are covered with the gate insulating layer 53. Each of the scanning lines provides gate electrodes for the thin film switching transistors of one of the rows, and the semiconductor layer 54 is formed on the gate insulating layer 53 over each of the gate electrodes. The semiconductor layer 54 is partially depressed, and a source region and a drain region are formed on both sides of the depression. A back channel 91 and a front channel 92 take place in the part of the semiconductor layer 54 between the source region and the drain region. The signal lines 63 are formed on the gate insulating layer 53 at intervals, and are directed in perpendicular to the scanning lines 52. The drain electrode 55 projects from the associated signal line 63, and is held in contact with the drain region of the semiconductor layer 54. The source electrode 56 and the pixel electrode 57 are formed on the gate insulating layer 53, and are integral with each other. The source electrode 56 is held in contact with the source region of the semiconductor layer 54, and the pixel electrode 57 extends in parallel to the adjacent two tooth of the comb-like common electrode 73. The thin film switching transistors 60 and the pixel electrodes 57 are covered with the protective insulating layer 58. The semiconductor layer 54 is partially depressed between the source region and the drain region, and the protective insulating layer 58 is conformably formed over the thin film switching transistors 60. For this reason, recesses are formed in the protective insulating layer 58 over the semiconductor layers 54. The spacers 79 are inserted into the recesses, and prevent the first and second substrate structures 300/400 from offset.

The second substrate structure 400 includes a glass substrate 71, a black matrix and color filters 81. The black matrix 72 is patterned over the glass substrate 71. The black matrix 72 is conductive, and is based. The black matrix 72 is formed of conductive metal, carbon and so forth. The area not occupied by the black matrix 72 is covered with the color filters 81, and the black matrix 72 is partially overlapped with the color filters 81. The spacers 79 are conductive, and project from the black matrix 72 uncovered with the color filters 81. The spacers 79 are formed of conductive synthetic resin, conductive metal, semiconductor material, carbon and so forth.

As described hereinbefore, the spacers 79 are held in contact with the protective insulating layer 58 at the leading ends thereof, and serve as back gates of the thin film switching transistors 60. A gate voltage $V_G$ such as, for example, the gate-off potential $V_{GOFF}$ or the bias voltage $V_{COM}$ on the common electrodes 73 is applied through the conductive black matrix 72 to the conductive spacers 79 during the operation of the liquid crystal display unit. The bias voltage VG or $V_{COM}$ induces the carrier opposite to the majority carrier in the back channel regions 91, and the conductivity is removed from or reduced in the back channels 91 due to the induced carrier. Thus, the spacers 79 prohibit the back channels 91 from flowing the leakage current, and make the pixels produce well contrasted color images. The irregularity is eliminated from the color images.

As will be appreciated from the foregoing description, the spacers are biased to the certain voltage $V_{GOFF}$ or $V_{COM}$ so as to prohibit the back channels 11/41/91 from flowing current. The transparency of the pixels is varied with the video signals selectively supplied to the pixel electrodes 57, and the thin film switching transistors 10/60 keep the potential differences between the pixel electrodes 7/57 and the common electrode 23/43/73. This results in a well-contrasted picture produced on the matrix of pixels. Irregularity is eliminated from the picture.

Although particular embodiments of the present invention have been shown and described, it will be apparent to those skilled in the art that various changes and modifications may be made without departing from the spirit and scope of the present invention.

For example, the spacer bodies 29 and the conductive spacers 79 may have a laminated structure of two layered selectively colored two of the primary three colors, i.e., red, green and blue. Moreover, the spacers 250/260 may be formed on the first substrate structure 100.

Photo-shield layers may be used for the spacers 250/260. In this instance, the photo-shield property is not required for the spacer bodies 29. The spacer bodies 29 are respectively covered with the photo-shield layers, and the photo-shield layers prevent the thin film switching transistors from the incident light.

What is claimed is:

1. A liquid crystal display unit comprising
a first substrate structure including
a first transparent substrate,
at least one thin film transistor fabricated on said first transparent substrate and having a first channel region and a second channel region closer to said first transparent substrate than said first channel region,
at least one pixel electrode formed over said first transparent substrate and connected through said at least one thin film transistor to a source of signal for creating an electric field and
a protective insulating layer covering said at least one thin film transistor,
a second substrate structure spaced from said first substrate structure so as to form a gap,
at least one conductive spacer inserted between said protective insulating layer and said second substrate structure and connected to a source of potential level so that said first channel region is biased with a certain potential level for decreasing a conductance of said first channel region, and
liquid crystal filling said gap between said protective insulating layer and said second substrate structure and changing an orientation depending upon the strength of said electric field.

2. The liquid crystal display unit as set forth in claim 1, in which said certain potential level is different from a bias voltage applied to a common electrode formed on one of said first and second substrate structures.

3. The liquid crystal display unit as set forth in claim 1, in which said certain potential level is equal to a potential level which makes the amount of current flowing between said pixel electrode and said source of signal through said first channel region minimized.

4. The liquid crystal display unit as set forth in claim 1, in which said certain potential level is equal to a bias voltage applied to a common electrode formed on one of said first and second substrate structures.

5. The liquid crystal display unit as set forth in claim 1, in which said at least one thin film transistor is an inverted stagger type field effect transistor.

6. The liquid crystal display unit as set forth in claim 5, in which said at least one thin film transistor includes
a gate electrode forming a part of a scanning line formed on said first transparent substrate,
a gate insulating layer formed over said first transparent substrate so as to cover said scanning line,
a semiconductor layer formed on said gate insulating layer, providing said first channel region and said second channel region and located in such a manner as to locate said second channel region over said gate electrode and oppose said first channel region to said at least one conductive spacer,
a drain electrode extending on said gate insulating layer and connected between said source of signal and a part of said semiconductor layer serving as a drain region and
a source electrode formed on said gate insulating layer together with said at least one pixel electrode and connected between said pixel electrode and another part of said semiconductor layer serving as a source region.

7. The liquid crystal display unit as set forth in claim 6, in which said semiconductor layer, said drain electrode and said source electrode form a depression in said protective insulating layer, and said at least one conductive spacer is partially received in said depression.

8. The liquid crystal display unit as set forth in claim 6, said certain potential level causing said at least one conductive spacer to minimize said conductance of said first channel region.

9. The liquid crystal display unit as set forth in claim 6, said certain potential level on said at least one conductive spacer being equal to a bias voltage applied to a common electrode formed on one of said first and second substrate structures.

10. The liquid crystal display unit as set forth in claim 6, said second substrate structure further including
a second transparent substrate,
a black matrix formed under said second transparent substrate and defining an opening nested in said at least one pixel electrode and
a planarization layer formed under said second transparent substrate in such a manner as to cover said black matrix, and
said common electrode and said at least one conductive spacer are formed under said planarization layer and electrically separated from one another.

11. The liquid crystal display unit as set forth in claim 10, in which said second substrate structure further includes at least one color filter formed under said second transparent substrate in such a manner as to fill said opening.

12. The liquid crystal display unit as set forth in claim 10, in which said common electrode is biased with a bias voltage different from said certain potential level, and is opposed to said at least one pixel electrode so as to create said electric field therebetween.

13. The liquid crystal display unit as set forth in claim 6, said second substrate structure further including
a second transparent substrate,
a black matrix formed under said second transparent substrate and defining an opening nested in said at least one pixel electrode and
a planarization layer formed under said second transparent substrate in such a manner as to cover said black matrix, and
said common electrode and said at least one conductive spacer being integral with one another under said planarization layer.

14. The liquid crystal display unit as set forth in claim 13, said second substrate structure further including at least one color filter formed under said second substrate structure in such a manner as to fill said opening.

15. The liquid crystal display unit as set forth in claim 13, in which said common electrode and said at least one conductive spacer being biased with said certain potential level appropriate for creating said electric field between said at least one pixel electrode and said common electrode.

16. The liquid crystal display unit as set forth in claim 6, said first substrate structure further including at least one common electrode formed on said first transparent substrate in parallel to said at least one pixel electrode for creating said electric field in parallel to said first transparent substrate.

17. The liquid crystal display unit as set forth in claim 16, said second substrate structure including a second transparent substrate and a conductive black matrix formed under said second transparent substrate and having an opening nested in said at least one pixel electrode, said at least one conductive spacer projecting from said conductive black matrix to said protective insulating layer.

18. The liquid crystal display unit as set forth in claim 17, in which said second substrate structure further includes at least one color filter formed under said second transparent substrate and fill said opening.

19. The liquid crystal display unit as set forth in claim 1, in which said at least one conductive spacer includes a spacer body and a conductive spacer electrode covering a surface of said spacer body.

20. The liquid crystal display unit as set forth in claim 19, in which said spacer body has photo-shielding property.

21. The liquid crystal display unit as set forth in claim 19, in which said spacer body has a laminated structure having plural layers colored two of red, green and blue.

22. The liquid crystal display unit as set forth in claim 1, in which said at least one conductive spacer is formed of conductive material selected from synthetic resin, metal, carbon and colored material used for at least one color filter forming a part of said second substrate structure.

* * * * *